W. I. SEYMOUR.
METHOD OF FORMING LENSES.
APPLICATION FILED JULY 8, 1907.
914,316.
Patented Mar. 2, 1909.
2 SHEETS—SHEET 1.
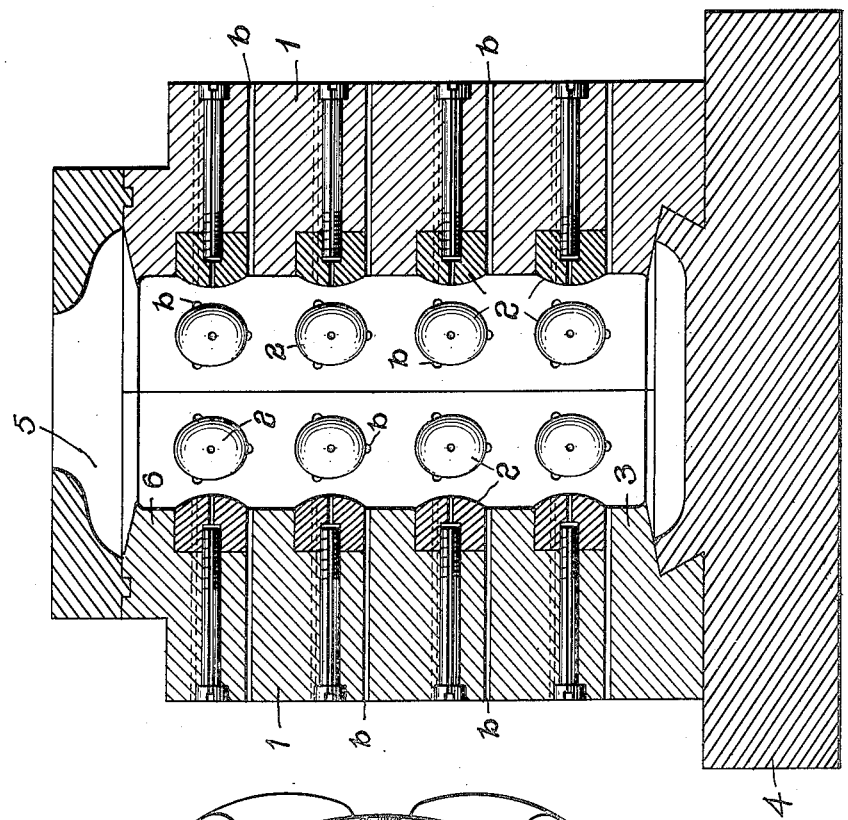
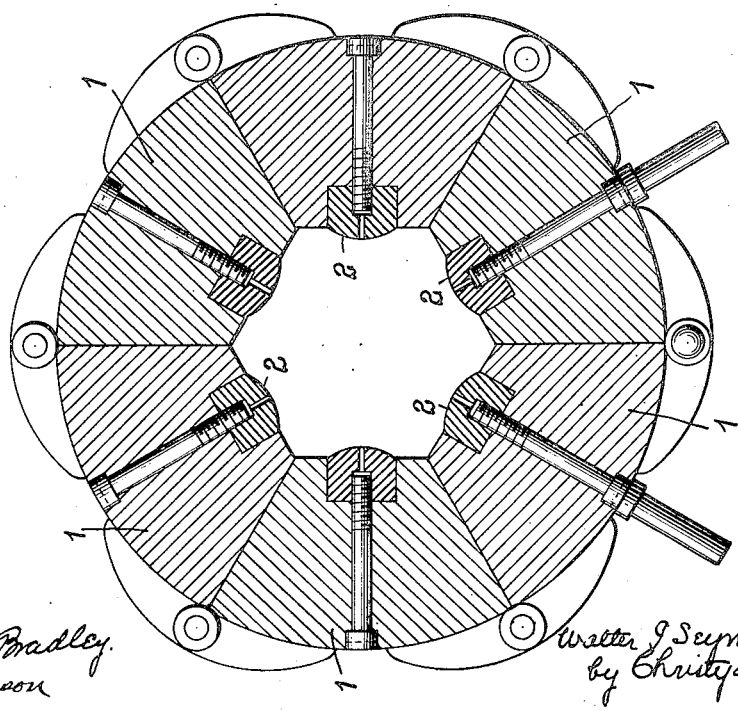
WITNESSES:
INVENTOR W. I. SEYMOUR.
METHOD OF FORMING LENSES.
APPLICATION FILED JULY 8, 1907.
914,316.
Patented Mar. 2, 1909.
2 SHEETS—SHEET 2.
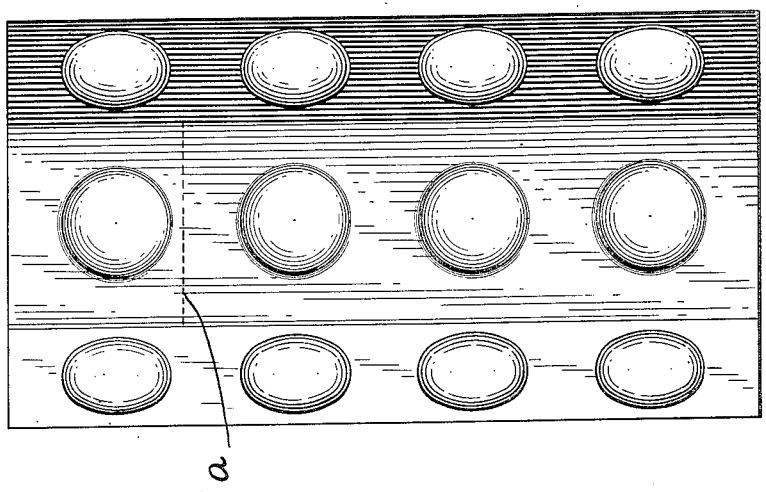

UNITED STATES PATENT OFFICE.

WALTER I. SEYMOUR, OF DENVER, COLORADO.

METHOD OF FORMING LENSES.

No. 914,316.   Specification of Letters Patent.   Patented March 2, 1909.

Application filed July 8, 1907. Serial No. 382,656.

*To all whom it may concern:*

Be it known that I, WALTER I. SEYMOUR, residing at Denver, in the county of Denver and State of Colorado, a citizen of the United States, have invented or discovered certain new and useful Improvements in Methods of Forming Lenses, of which improvements the following is a specification.

In an application for Letters Patent, Serial No. 372,270 filed May 6th, 1907, I have described and claimed a method of forming lenses, which consists in uniting two bodies of glass while in a molten condition, imparting to the uniting surfaces the contour desired in the finished lens, while the united bodies are in molten or plastic condition and in imparting to the outer surfaces of the united bodies the shape or contour desired in the finished lens, by grinding.

The invention described herein relates to further improvements in the art set forth in said application and consists specifically in uniting two bodies of glass differing in kind, index or color, while such bodies are in a molten condition and in imparting to a portion of their uniting surfaces a contour differing from that of other portions of the uniting surfaces, and corresponding to the contour which such uniting surfaces should have in the finished lens.

In the accompanying drawing forming a part of this specification, Figure 1 is a sectional elevation of my improved mold; Fig. 2 is a sectional plan view; Fig. 3 is an elevation of a shell formed in the mold and showing the manner of dividing the shell to form blanks for lenses; Fig. 4 shows one of the blanks; and Fig. 5 shows a lens formed from such blank.

My improved mold consists of a series of sections 1 hinged together to permit of the mold being opened and closed for the insertion of the blow-pipe and the body of glass to be blown, and the removal of the completed shell. While the inner or shaping walls of the sections may be curved so that the completed shell will be cylindrical, it is preferred that the inner or shaping walls of the section should be flat so that the completed shell will be polygonal. The width of the forming faces of the sections 1 will be dependent upon the dimensions of the lens-blank to be formed. These sections are provided on their inner faces with a series of protuberances having curved surfaces adapted when the glass is pressed against them in blowing or pressing to impart to the uniting surfaces, the curvature desired in the finished lens. The curvature of these protuberances will depend upon the desired curvature to be imparted to the uniting faces of the two layers of glass. These protuberances may be formed integral with the wall of the sections, but are preferably formed detachable therefrom in the form of plugs 2 which can be inserted in sockets in the inner walls of the sections. The lower end of the mold is provided with a shoulder 3 adjacent to a recess in the base 4 over which the glass is stretched in blowing, so as to make it thin to permit of the ready removal of the lower end of the shell. The upper end of the mold is provided with a blow-over cavity 5 and shoulders 6 are provided over which the glass is stretched in expanding into this blow-over cavity so as to produce a thin wall permitting of the easy breaking off of the blow over.

It will be readily understood by those skilled in the art that the glass may be caused to conform with the wall of the mold either by pressing or blowing, but preferably by blowing. In making the shells a mass of glass of one kind, index or color, is gathered on the end of a blow pipe and after removal from the pot may, if desired, be slightly shaped. This mass of glass is then progressively dipped into another body of molten glass, so that this second mass of glass will wash away, as the first is immersed therein, any defects, foreign matters, lines or bubbles on the surface of the first body, so that a perfect flawless union between the two bodies or layers of glass, is obtained. After the second layer has been collected and united with the first body, the mass of glass on the end of the blow-pipe is marvered as is customary in blowing glass, and then placed in the mold which is then closed and the glass expanded by blowing. The blow pipe is then broken off and the completed shell removed. As shown this shell, when the inner walls of the mold sections are flat, is polygonal in cross section and along the flat exterior surfaces are formed a series of curved pockets or depressions. In forming bifocal lenses, this cylinder is divided or cut up along its angles and then transversely to form lens-blanks, the position of the transverse cut being dependent upon the location of the second focus desired in the completed lens. As this second focus is usually located adjacent to the lower edges of the spectacle lens, the transverse cut is along the line a just below the pocket or depression or may partly bisect such pocket or depression. The blank thus formed is then rough ground until all of the lead glass is removed except for the area of the second or focus reading portion of the lens, the rest of the blank being composed of the crown glass. The exterior surfaces of this roughly formed lens are then completed in the manner well known in the art and the desired peripheral contour imparted thereto.

It will be readily understood by those skilled in the art that a lens with more than two foci can be formed by increasing the number of layers of glass which differing in kind, index or color are superposed while the glass is in a molten condition, upon the body of glass first gathered.

In order that the glass may closely conform to the shape of the matrix of the mold, vents b are formed adjacent to and also through the plugs for the escape of air.

I claim herein as my invention:

1. The method herein described of making lenses, which consists in uniting two bodies of glass differing in kind or index, while such bodies are in a molten condition, and changing the contour of a portion of the uniting surfaces of the bodies.

2. The method herein described of making lenses, which consists in uniting two bodies of glass differing in kind or index while such bodies are in a molten condition, and imparting to a portion of the uniting surfaces of the bodies a contour differing from the contour of the remaining portion of such uniting surfaces.

3. The method of making lenses herein described, which consists in superposing on a body of glass a second body of glass differing from the first in kind or index and imparting to a portion of the contacting surfaces of said bodies, the curvature desired in the finished lens.

4. The method of making lenses herein described, which consists in uniting two bodies of glass differing in kind or index while in a molten condition, changing the contour of a portion of the uniting surfaces of said bodies, and removing by grinding a portion of one of the layers and finishing the lens.

5. The method of forming lenses, which consists in uniting two bodies of glass differing in kind or index while said bodies are in a molten condition, forming a pocket or recess and thereby shaping a portion of the uniting surfaces of the bodies, and removing all of one layer except the portion of the part in line with the pockets.

6. The method of forming lenses, which consists in uniting two bodies of glass differing in kind or index while said bodies are in a molten condition, shaping said bodies, flattening a portion of the uniting surfaces and curving other portions thereof.

7. The process of making bifocal lens, which consists in inseparably connecting two pieces of glass of different indices of refraction and pressing a portion of the said glasses out of alinement with the remaining portion and grinding away such proportions of the opposite sides of the composite glass as may be desired to produce the lens.

8. The process of making a bifocal lens, which consists in fusing together two pieces of glass of different indices of refraction and pressing a portion of said glass out of alinement with the remaining portion and grinding away such proportions of the opposite sides of the said composite glass as may be desired to produce the lens.

9. The process of making a bifocal lens, which consists in connecting by fusion two pieces of glass of different indices of refraction and occasioning the projection of a portion of one of the glasses beyond the adjacent surface of the other glass and afterward finishing by grinding and shaping into a completed lens.

10. The process of making bifocal lens, which consists in inseparably connecting by fusion two pieces of glass, and while the composite glass is of a temperature at which it is bendable occasioning the projection of a portion of one of the glasses into alinement with a portion of the other glass and afterward grinding, shaping and finishing the composite glass into a lens.

11. The process of making bifocal lenses which consists in inseparably uniting the surfaces of two pieces of glass differing in kind or index and occasioning the projection of a portion of one of the glasses beyond the adjacent surface of the other glass.

In testimony whereof, I have hereunto set my hand.

WALTER I. SEYMOUR.

Witnesses:
 CHARLES BARNETT,
 F. J. TOMASSON.